Jan. 23, 1962     I. R. VINCI     3,018,344
ELECTRIC CURBGUARD
Filed June 8, 1960
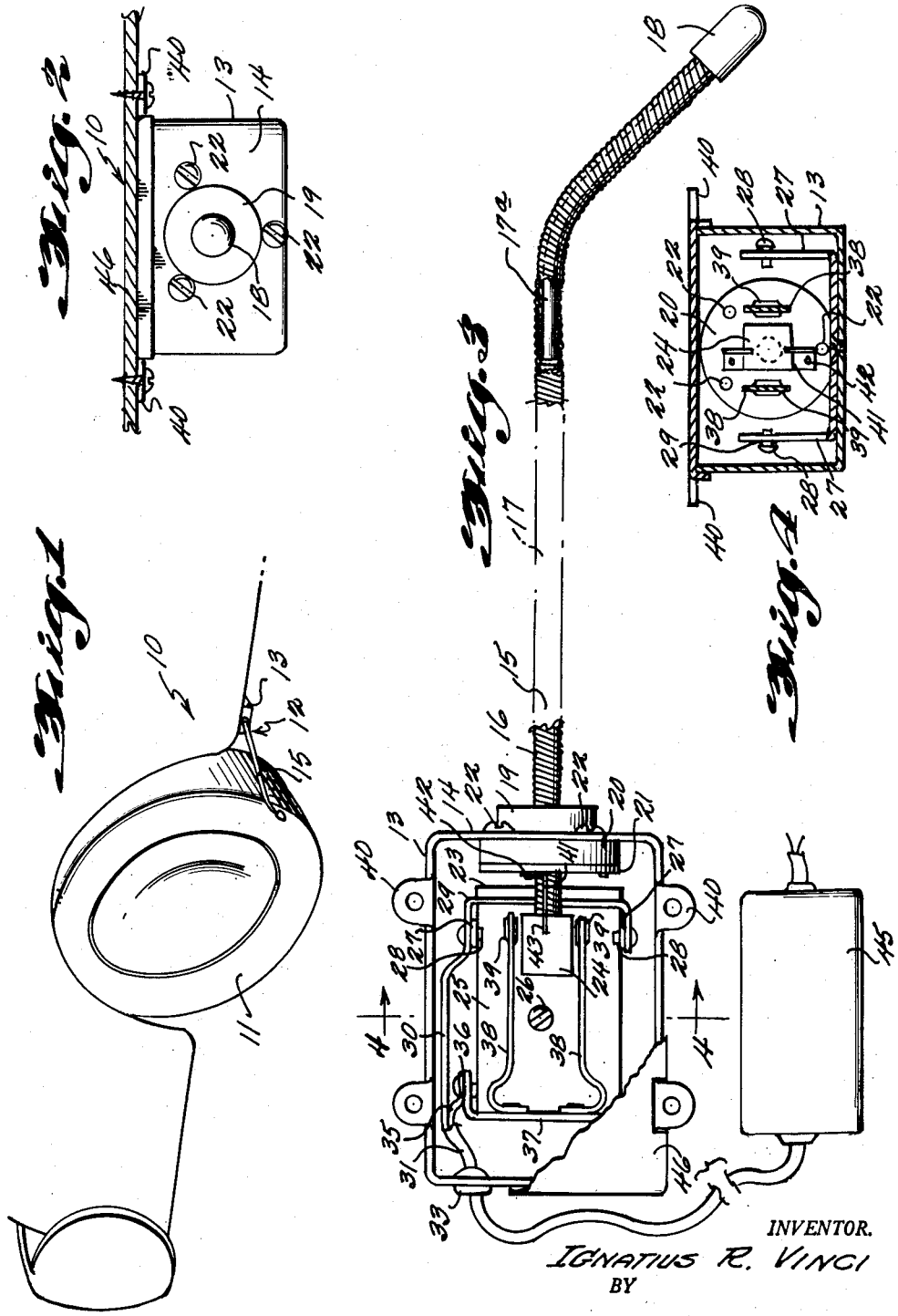
INVENTOR.
IGNATIUS R. VINCI
BY
Kimmel & Crowell
ATTORNEYS United States Patent Office 3,018,344
Patented Jan. 23, 1962

3,018,344
ELECTRIC CURBGUARD
Ignatius R. Vinci, 120 Lake St., Le Roy, N.Y.
Filed June 8, 1960, Ser. No. 34,796
4 Claims. (Cl. 200—61.44)

This invention relates to an electric curbguard and guide for motor vehicles such as automobiles, trucks or the like, and has as its primary object the provision of an improved feeler or guide member adapted to be positioned adjacent the wheel of a motor vehicle and so arranged as to extend outwardly from the side of the vehicle, provision being made so that upon impact of the end of the feeler or guide with the curb an audible or visual signal is transmitted to the dashboard of the automobile.

An additional object of the invention is the provision of such a device characterized by simplicity of construction, reliability of operation, and positioned in a casing, having a removable cover so that access to the operating parts may be readily had if necessary.

A further object of the invention is the provision of a device of this character which may be simply and quickly attached to any existing motor vehicle in any desired location adjacent the wheel or in any position along the side thereof, with a minimum of effort and difficulty.

Still other objects reside in the arrangements of parts, combinations of elements, and features of construction, all as will be more fully pointed out hereinafter and shown in the accompanying drawing wherein there is disclosed a preferred embodiment of this inventive concept.

In the drawing:

FIGURE 1 is a fragmentary perspective view of a motor vehicle such as an automobile, showing the device of the instant invention positioned thereon.

FIGURE 2 is an enlarged fragmentary side elevational view of the device, parts of the automobile frame being shown in section.

FIGURE 3 is a plan view of the device removed from the motor vehicle, showing a portion of the cover thereon, and parts being broken away.

FIGURE 4 is a sectional view taken substantially along the line 4—4 of FIG. 3 as viewed in the direction indicated by the arrows.

Similar reference characters refer to similar parts throughout the several views of the drawing.

Having reference now to the drawing in detail, there is generally indicated at 10 an automobile or similar motor vehicle having a wheel 11. The device of the instant invention, generally indicated at 12, is positioned closely adjacent one of the wheels, in the illustrative embodiment the rear wheel of the vehicle, but additional devices may be positioned either forwardly or rearwardly of either or both the front and rear wheels on either or both sides of the vehicle depending on the circumstances.

The device comprises a casing 13, which has an end wall 14 having a central opening, through which extends a feeler rod 15. The feeler rod 15 is preferably in the form of a flexible tightly coiled spring 16, which is preferably plated with stainless steel or cadmium to prevent rusting as indicated at 17. A copper shaft 17a bent to an angle of approximately 45° may be positioned interiorly of spring 17 adjacent its outer end to position the end close to the curb. A rubber ball 18 is provided on the outer end of the feeler 15, and is adapted to contact the curb when the car to which the device is attached comes too close thereto. A flexible rubber plug 19 surrounds the rod 16 at its juncture with the end wall 14 in box 13, and includes an enlarged interior section 20, which is backed by a reinforcing plate 21, the plug being held in position by means of screws 22 which extend through the wall 14 into the plate 21. The plate takes the form of an annulus having a relatively large central opening through which the end 23 of the feeler extends, and upon this end 23 is positioned a relatively heavy block 24. Block 24 may be formed of solder, powdered metal, Bakelite plastic or nylon. Positioned interiorly of the casing is an insulating plate 25 secured to the bottom thereof as by a screw 26, which is provided with a pair of upwardly extending oppositely disposed lugs 27 on either side of the block 24. Each of the lugs carries a contact member 28, the contact members 28 being connected as by wires 29, a common wire 30 leading to a wire conduit 31, which extends through a rubber plug 32 in the rear wall 33 of casing 13.

An additional wire 35 extends from the conduit 31 to a lug 36, which is carried by a flange 37 mounted on the plate 25, the flange 37 carrying a pair of oppositely disposed resilient contact fingers 38, each of which is provided at its end with a contact 39, the contacts 39 being aligned with the contacts 28.

Lugs 40 are provided for attaching the device, by means of suitable screws or the like, to the underside of the motor vehicle at any desired location.

A copper L-shaped spring member 41 is provided, and is secured as by means of rivets 42 to the inner side of plate 21, the outstanding leg 43 of the member being suitably engaged by the solder block 24, the copper member serving as an additional reinforcing means to return the solder block 24 to centered position, when the FIGURE 15 is bent by impact with a curb or the like.

Conduit 31 extends to a suitable box 45 which contains a buzzer or the like, and which is adapted to be positioned on the dashboard of a motor vehicle, or at other suitable locality so that it may be readily heard by the driver of the vehicle. Obviously, a visual signal may be substituted for the audible signal if desired. A cover member 46 is provided for the device to prevent dirt from penetrating the interior of the box.

From the foregoing it will now be seen that there is herein provided an improved electric signal in association with a curbguard for motor vehicles which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a curbguard for a motor vehicle, a switch including the combination of a receptacle adapted to be positioned on the underside of the motor vehicle adjacent a wheel thereof, said receptacle having an opening in one end wall thereof, an apertured rubber plug in said opening, a relatively long spring finger extending through the aperture in said rubber plug and adapted to extend outwardly of the vehicle, a rubber cap on the outer end of said finger, a plate interiorly of said casing, a pair of spaced apart lugs extending upwardly from said plate, oppositely disposed contacts on said lugs, a flange on said plate extending transversely to said lugs, a pair of spaced apart spring arms on said flange, a contact on each arm confronting a contact on one of said lugs, a block on the inner end of said spring finger positioned between said arms whereby tilting of said finger in either direction will engage a contact on the spring arm with the contact on the adjacent lug for completing and breaking a circuit to a remotely positioned electric indicator.

2. The structure of claim 1 wherein a metal annulus is positioned on the inner side of said plug, and screws extending through said end wall of said casing in said metal plate secure said plug in position in said opening.

3. The structure of claim 2 wherein a copper plate is secured to said last-mentioned plate and engages said solder block, said plate being resilient and normally biasing said solder block to centered position between said spring arms.

4. The structure of claim 1 wherein said receptacle is provided with a removable cover to provide access to the parts.

References Cited in the file of this patent

UNITED STATES PATENTS

| | | |
|---|---|---|
| 2,813,940 | Poet | Nov. 19, 1957 |
| 2,902,671 | Pitt | Sept. 1, 1959 |

FOREIGN PATENTS

| | | |
|---|---|---|
| 130,262 | Australia | Nov. 25, 1948 |